July 2, 1968   R. F. HODGSON ETAL   3,390,700

CONTROL VALVES

Filed April 26, 1965

INVENTORS
Robert F. Hodgson &
Arthur J. Williams

United States Patent Office 3,390,700
Patented July 2, 1968

3,390,700
CONTROL VALVES
Robert F. Hodgson, Canfield, and Arthur J. Williams, Hubbard, Ohio, assignors to Commercial Shearing & Stamping Company, a corporation of Ohio
Filed Apr. 26, 1965, Ser. No. 450,797
5 Claims. (Cl. 137—612.1)

This invention relates to control valves and particularly to a control valve incorporating a low pressure passage which does not intersect the main bore of the valve and which is spaced from and transverse to the bore of the valve in a plane parallel to the plane of the valve bore.

Hydraulic control valves normally provide an exhaust chamber intersecting the valve bore adjacent to each work chamber. Return fluid from a work cylinder or motor is carried into the work chamber and then through the bore to the adjacent exhaust passage either through a hollow portion of the spool or through a reduced portion on the spool periphery.

We have discovered that the inclusion of an additional low pressure or exhaust passage in such valves intermediate the ends of the valve and in a plane which does not intersect the valve bore provides unique advantages. In such a valve structure it is readily possible to provide cross-over, anti-cavitation, relief and many other highly desirable functions without excessive porting, coring and drilling.

In a preferred embodiment of our invention we provide a valve body having a longitudinal bore, a valve element in said bore movable axially therein from a neutral position to at least one work position, an inlet chamber intersecting said bore, an outlet chamber intersecting the bore spaced from the inlet, at least one work chamber intersecting the bore spaced from the inlet and outlet chambers and communicating with the inlet chamber by means of the valve element, an exhaust chamber intersecting the bore adjacent the work chamber, a parallel exhaust passage ("parallel" as used in this application in connection with valve passages shall be defined in the sense of its normal usage in the valve art as meaning carrying fluid in generally the same direction and not in its classical sense) extending through said valve body transversely to the bore and spaced therefrom in a plane parallel to the plane of the bore and providing communication through said valve body and passage means selectively connecting the work chamber and said parallel exhaust passage or two work chambers together or to said exhaust passage.

Figure 1:
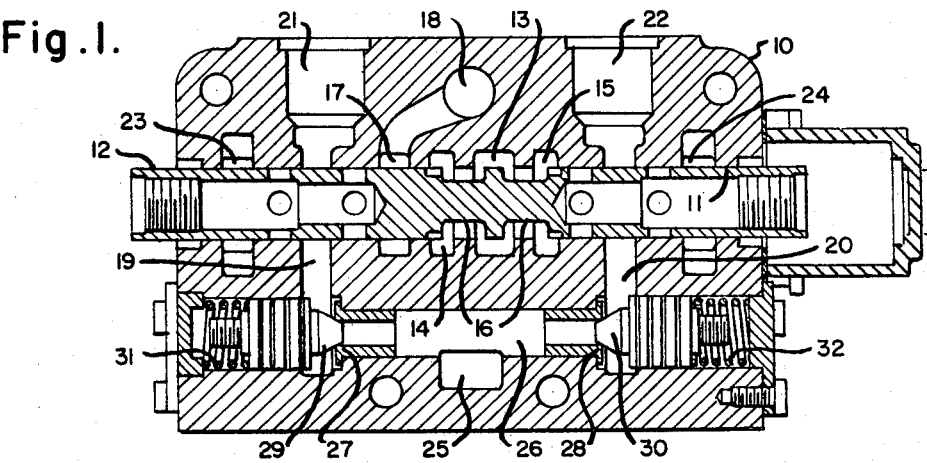
Figure 2:
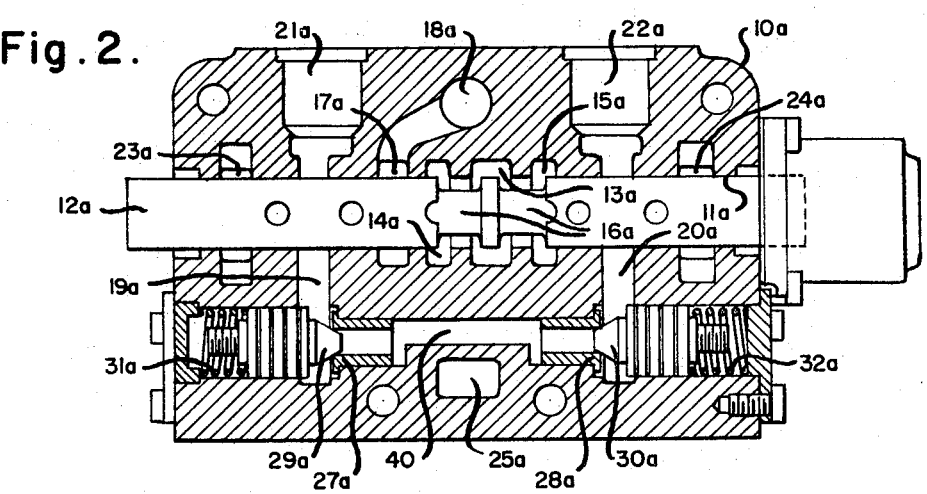
Figure 3:
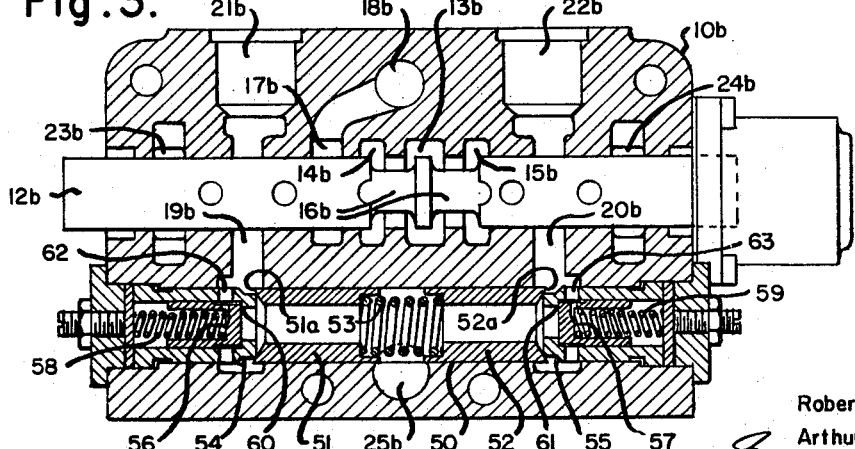

In the foregoing general description of our invention we have set out certain objects, purposes and advantages. Other objects, purposes and advantages of our invention will be apparent from the following description and the accompanying drawings in which, FIGURE 1 is a longitudinal transverse section through a valve incorporating this invention together with relief valves from the work chambers;

FIGURE 2 is a longitudinal transverse section through a valve incorporating this invention in a cross-over or swing type circuit; and FIGURE 3 is a longitudinal transverse section through a valve incorporating this invention in a combination relief and anti-cavitation circuit.

Referring to the drawings, we have illustrated a housing 10 having a longitudinal bore 11 extending therethrough. A valve element 12 is slidable axially of the bore for a neutral position as shown in FIGURE 1 to either of two work positions, one to the right and one to the left of the neutral position illustrated. An outlet 13 intersects the bore intermediate its length and communicates with a tank of fluid through an outlet port not shown but conventional in form. A pair of inlet chambers 14 and 15 intersect the bore on either side of the outlet chamber 13 and communicate with the outlet chamber through grooves 16 in the valve element when said element is in the neutral position. A branch passage 17 intersects the bore adjacent one of the inlet chambers 14 and 15 and communicates with a source of high pressure fluid through a passage 18 transverse to the body in a plane spaced from and parallel to the axis of bore 11. The inlet chambers communicate with an inlet port which in turn communicates with the source of high pressure fluid. A pair of work chambers 19 and 20, one on each side of the inlet chambers, intersect the bore and communicate to the exterior of the body through motor ports 21 and 22, respectively. Exhaust or low pressure passages 23 and 24 are provided, one on each extreme of the bore and adjacent the work chambers. A parallel low pressure passage 25 is provided beneath the bore in a plane spaced from and parallel to the axis of the bore, said passage extending in a direction generally transverse to the length of the bore. A passage 26 extends parallel to the bore intersecting parallel passage 25 from one work chamber 21 to the other work chamber 22 interconnecting said ports and said parallel low pressure passage. Valve seats 27 and 28 are provided at the ends of passage 26 in the walls of chambers 21 and 22. Relief valves 29 and 30 seat against these valve seats 27 and 28 and are held in position by preloaded springs 31 and 32 in usual fashion.

In the foregoing structure the fluid in either work chamber is vented to the parallel low pressure passage 26 when it exceeds a desired high level.

In FIGURE 2 we have illustrated a structure identical with that of FIGURE 1 and in which like parts bear like numbers with the addition of the suffix a except that the passage 40 connecting work chambers 19a and 20a bypasses the parallel low pressure passage 25a. This permits the two work chambers to be interconnected so that fluid from one side of a motor (not shown) is forced to the other side of said motor by way of work passage 21a or 22a, check valve 29a or 30a and passage 40 to the opposite work chamber. This provides a highly desirable "cross-over" or "swing" type circuit in a very compact body. At the same time, parallel passage 25a extends through the body to be connected by next preceding or succeeding valve sections as for example the structure of FIGURE 1.

In FIGURE 3 we have illustrated a combination relief and anti-cavitation valve. The valve structure is identical with that of FIGURE 1 in body and valve element construction and like elements bear like numbers with the suffix b. In this valve the work chambers 19b and 20b are connected by a passage 50 which intersects low pressure parallel passage 25b and is generally larger in diameter than passage 26 of FIGURE 1. Relief valve members 51 and 52 are axially movable in passage 50 in opposite directions toward the end of said passage by spring 53 against seats 54 and 55. These relief valves open when the pressure against the sloping forward surfaces 52a or 51a exceeds the spring pressure. This discharges the particular work chamber to passage 25b. Inside each of seats 54 and 55 we provide check valves 56 and 57, respectively, which are urged by relatively light springs 58 and 59 against seats 60 and 61. Openings 62 and 63 open through the walls of seat 54 and 55 into work chambers 19b and 20b. When a work cylinder is rapidly being lowered and the souce of fluid to the input side is unable to keep up with demand, a suction is created. This causes fluid to be drawn from low pressure passage 25b through one of the valve seats 54 and 55, its corresponding check valve 56 or 57 and throughh openings 62 or 63 into the appropriate work chamber thereby providing relief against cavitation.

It will, of course, be obvious that the use of an additional low pressure passage extending transversely through the valve body spaced from the valve bore may serve many purposes and be used with various combinations of relief valves, pilot operated reliefs, regenerative circuits and other combinations of known valve elements to provide unique results not heretofore possible within a small valve housing or body.

While we have illustrated and described certain presently preferred embodiments of our invention, it will be understood that this invention may be otherwise embodied within the scope of the following claims.

We claim:

1. In a control valve having a body, a longitudinal bore in said body slidably receiving a valve element, a valve element slidable axially in said bore between a neutral and at least one work position in which work position fluid is delivered from at least one of a pair of spaced apart generally parallel inlets transverse to and intersecting the bore at spaced apart points to a work chamber intersecting said bore and communicating with the exterior of the body and at least one exhaust position in which fluid is delivered from said work chamber to an adjacent exhaust chamber intersecting said bore, and an exhaust passage connecting said exhaust chamber with a low pressure tank, the improvement comprising a first passage extending through said body in a plane spaced from and parallel to the axis of the bore, said passage intersecting the work chamber, a second passage lying transverse to the bore and communicating with a low pressure tank, said second passage having means adapted to be selectively connected through said first passage with said work chamber and said low pressure tank, said second passage being independent of said exhaust chamber.

2. In a control valve having a body, a longitudinal bore in said body slidably receiving a valve element, a valve element slidable axially in said bore between a neutral and at least two work positions and two corresponding exhaust positions, one on each side of the neutral position in which work and corresponding exhaust positions fluid is delivered from at least one of a pair of spaced apart generally parallel inlets transverse to and intersecting the bore at spaced apart points to one of two work chambers intersecting said bore and communicating with the exterior of the body and simultaneously fluid is delivered from the other of said work chambers to an adjacent exhaust chamber intersecting said bore and an exhaust passage connecting said exhaust chamber with a low pressure tank, the improvement comprising a first passage extening through said body in a plane spaced from and parallel to the axis of the bore, said passage intersecting the work chamber, a second passage lying transverse to the bore and communicating with a low pressure tank, said second passage being adapted to be selectively connected through said first passage with said work chambers and said low pressure tank and being independent of said exhaust chamber.

3. In a control valve having a body, a longitudinal bore in said body slidably receiving a valve element, a valve element slidably axially in said bore between a neutral and at least one work position in which work position fluid is delievered from at least one of a pair of spaced apart generally parallel inlets transverse to and intersecting the bore at spaced apart points to a work chamber intersecting said bore and communicating with the exterior of the body and at least one exhaust position in which fluid is delivered from said work chamber to an adjacent exhaust chamber intersecting said bore and an exhaust passage connecting said exhaust chamber with a low pressure tank, the improvement comprising a first passage extending through said body in a plane spaced from and parallel to the axis of the bore, said passage intersecting the work chamber, a second passage transverse to the bore and communicating with a low pressure tank, said second passage being connected with said work chamber through said first passage and a relief valve therein, said second passage being independent of said exhaust chamber.

4. In a control valve having a body, a longitudinal bore in said body slidably receiving a valve element, a valve element slidable axially in said bore between a neutral and at least one work position in which work position fluid is delivered from at least one of a pair of spaced apart generally parallel inlets transverse to and intersecting the bore at spaced apart points to a work chamber intersecting said bore and communicating with the exterior of the body and at least one exhaust position in which fluid is delivered from said work chamber to an adjacent exhaust chamber intersecting said bore and an exhaust passage connecting said exhaust chamber with a low pressure tank, the improvement comprising a first passage extending through said body in a plane spaced from and parallel to the axis of the bore, said passage intersecting the work chamber, a second passage connected to said first passage and lying transverse to the bore and communicating with a low pressure tank, said first passage being connected with said work chamber, a relief valve blocking communication from the work chamber to said first passage at pressures below a preselected level, and check valve means between said work chamber and first passage opening to connect said first passage and work chamber when the pressure in said chamber drops below a preselected level, said second passage being independent of said exhaust chamber.

5. In a control valve as claimed in claim 4 wherein said relief valve is hollow and said check valve operates within said hollow relief valve.

References Cited

UNITED STATES PATENTS

| | | | |
|---|---|---|---|
| 2,359,802 | 10/1944 | Stephens | 137—596.2 |
| 2,363,481 | 11/1944 | Campbell | 137—596.2 |
| 2,710,628 | 6/1955 | Hodgson | 137—596.2 |
| 2,965,133 | 12/1960 | Rice et al. | 137—596.2 X |
| 3,194,265 | 7/1965 | Tennis | 137—596 |
| 3,216,446 | 11/1965 | Schmiel | 137—596 |
| 3,213,762 | 10/1965 | Dubuf | 137—612.1 XR |

HENRY T. KLINKSIEK, *Primary Examiner.*

M. CARY NELSON, *Examiner.*

R. J. MILLER, *Assistant Examiner.*

UNITED STATES PATENT OFFICE
CERTIFICATE OF CORRECTION

Patent No. 3,390,700                                              July 2, 1968

Robert F. Hodgson et al.

It is certified that error appears in the above identified patent and that said Letters Patent are hereby corrected as shown below:

Column 1, line 68, after "outlet" insert -- chamber --. Column 2, line 68, "throughh" should read -- through --. Column 3, line 48, "extening" should read -- extending --.

Signed and sealed this 16th day of December 1969.

(SEAL)
Attest:

Edward M. Fletcher, Jr.                          WILLIAM E. SCHUYLER, JR.
Attesting Officer                                        Commissioner of Patents